United States Patent
Sekito et al.

(10) Patent No.: US 10,065,477 B2
(45) Date of Patent: Sep. 4, 2018

(54) AIR CONDITIONER FOR VEHICLE

(71) Applicant: DENSO CORPORATION, Kariya, Aichi-pref. (JP)

(72) Inventors: Yasuhiro Sekito, Kariya (JP); Shun Omori, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 133 days.

(21) Appl. No.: 15/033,046

(22) PCT Filed: Oct. 30, 2014

(86) PCT No.: PCT/JP2014/005489
§ 371 (c)(1),
(2) Date: Apr. 28, 2016

(87) PCT Pub. No.: WO2015/064106
PCT Pub. Date: May 7, 2015

(65) Prior Publication Data
US 2016/0243922 A1    Aug. 25, 2016

(30) Foreign Application Priority Data

Nov. 1, 2013 (JP) .................................. 2013-228413
Sep. 2, 2014 (JP) .................................. 2014-178166

(51) Int. Cl.
*B60H 1/00*     (2006.01)
*B60H 1/12*     (2006.01)

(52) U.S. Cl.
CPC ..... *B60H 1/00857* (2013.01); *B60H 1/00064* (2013.01); *B60H 1/00678* (2013.01); *B60H 1/12* (2013.01); *B60H 2001/00707* (2013.01)

(58) Field of Classification Search
CPC ............ B60H 1/00692; B60H 1/00857; B60H 1/00664; F24F 11/027; F24F 13/10; F24F 13/12; F24F 13/14; F24F 13/1426
See application file for complete search history.

(56) References Cited

U.S. PATENT DOCUMENTS

| | | | |
|---|---|---|---|
| 6,622,787 B1 | 9/2003 | Toyoshima et al. | |
| 2003/0145978 A1* | 8/2003 | Tsurushima | ....... B60H 1/00692 165/11.1 |

(Continued)

FOREIGN PATENT DOCUMENTS

| | | |
|---|---|---|
| JP | H02286422 A | 11/1990 |
| JP | H03040473 U | 4/1991 |

(Continued)

OTHER PUBLICATIONS

International Search Report and Written Opinion (in Japanese with English Translation) for PCT/JP2014/005489, dated Jan. 27, 2015; ISA/JP.

*Primary Examiner* — Len Tran
*Assistant Examiner* — Eric Ruppert
(74) *Attorney, Agent, or Firm* — Harness, Dickey & Pierce, P.L.C.

(57) ABSTRACT

An air conditioner for a vehicle has a first shaft that drives a first air-mix door in conjunction with being rotated, a second shaft that drives a second air-mix door in conjunction with being rotated, and a rack that interlocks the first shaft and the second shaft with each other. The rack has an elongated shape, thereby a mounting space can be smaller with respect to a rink mechanism. Therefore, an air conditioning unit can be downsized.

6 Claims, 11 Drawing Sheets

(56) References Cited

U.S. PATENT DOCUMENTS

| | | |
|---|---|---|
| 2013/0008627 A1 | 1/2013 | Uemura |
| 2013/0059522 A1 | 3/2013 | Ota et al. |
| 2015/0107815 A1 | 4/2015 | Hhraguchi et al. |

FOREIGN PATENT DOCUMENTS

| | | | |
|---|---|---|---|
| JP | 09175147 | * | 7/1997 |
| JP | H09175147 A | | 7/1997 |
| JP | 11254944 | * | 9/1999 |
| JP | H11245652 A | | 9/1999 |
| JP | 2000043535 A | | 2/2000 |
| JP | 2000238524 A | | 9/2000 |
| JP | 2012200338 A | | 10/2012 |
| JP | 2013014284 A | | 1/2013 |
| JP | 2013052750 A | | 3/2013 |
| JP | 2013133068 A | | 7/2013 |

* cited by examiner

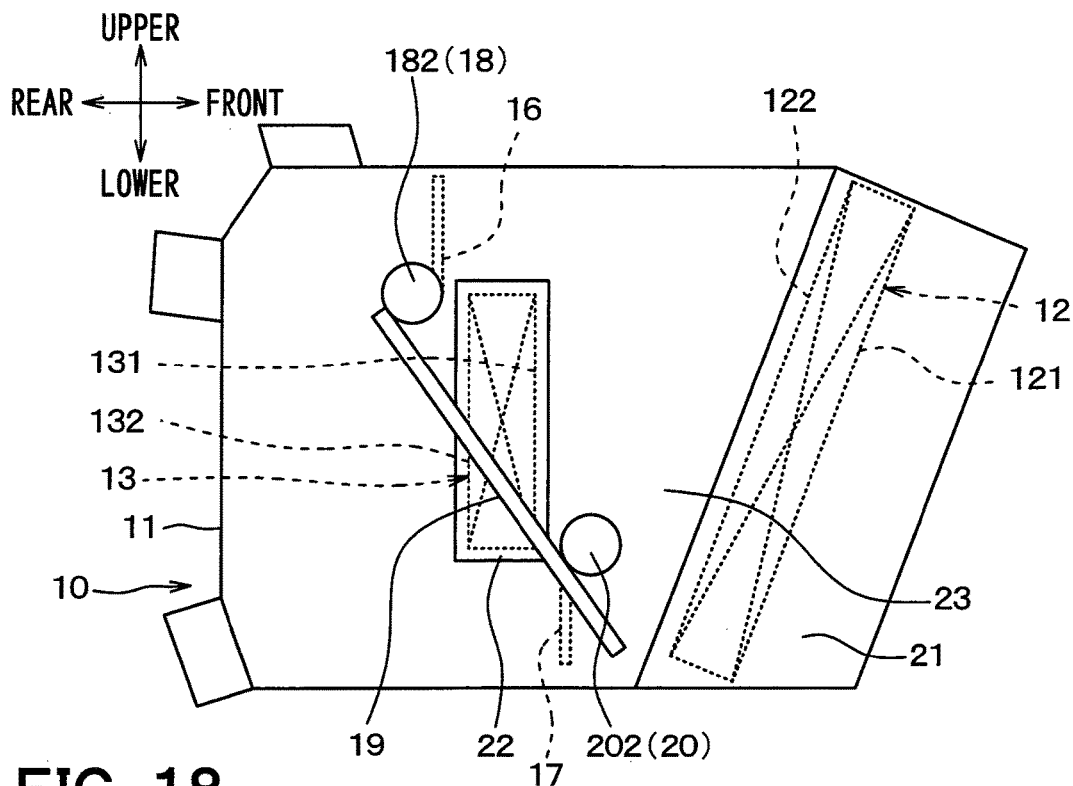
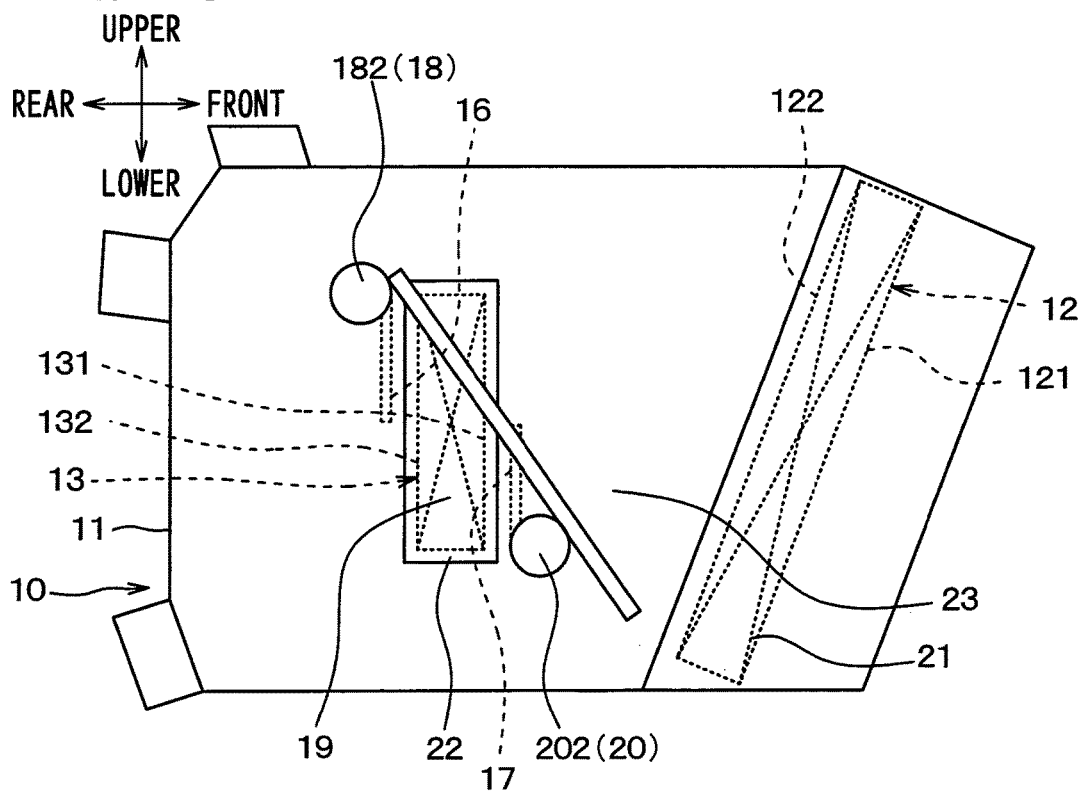

AIR CONDITIONER FOR VEHICLE

CROSS REFERENCE TO RELATED APPLICATIONS

This application is a U.S. National Phase Application under 35 U.S.C. 371 of International Application No. PCT/JP2014/005489 filed on Oct. 30, 2014 and published in Japanese as WO 2015/064106 A1 on May 7, 2015. This application is based on and claims the benefit of priority from Japanese Patent Application No. 2013-228413 filed on Nov. 1, 2013 and Japanese Patent Application No. 2014-178166 filed on Sep. 2, 2014. The entire disclosures of all of the above applications are incorporated herein by reference.

TECHNICAL FIELD

The present disclosure relates to an air conditioner for a vehicle that has two doors for mixing air.

BACKGROUND ART

Conventionally, such kind of an air conditioner for a vehicle is disclosed in, for example, Patent Literature 1. According to an air conditioner for a vehicle of Patent Literature 1, a warm-air passage passing a heater core (i.e., a heating heat exchanger) is formed in an air conditioning case. Further, cold-air bypass paths bypassing the heater core is formed on both sides of the warm-air passage in an upper-lower direction.

A first air-mix door opens or closes an upper portion of the warm-air passage and an upper cold-air passage, and a second air-mix door opens or closes a lower portion of the warm-air passage and a lower cold-air passage. The two air-mix doors are configured by a cantilever door. The two air-mix doors are operated by an electric motor through a link mechanism to interlock with each other. The link mechanism is arranged outside of the air conditioning case and is located between the heater core and an evaporator (i.e., a cooling heat exchanger) when viewed in an axial direction of a shaft of the air mix door.

On the other hand, Patent Literatures 2 to 5 disclose an air conditioner for a vehicle, a first air-mix door and a second air-mix door of which is configured by a slide door that has a plate shape and moves slidably.

PRIOR ART LITERATURES

Patent Literature

Patent Literature 1: JP H11-245652 A
Patent Literature 2: JP 2000-238524 A
Patent Literature 3: JP 2013-133068 A
Patent Literature 4: JP 2013-052750 A
Patent Literature 5: JP 2013-014284 A

SUMMARY OF INVENTION

However, according to the conventional air conditioner for a vehicle, a mounting space for the link mechanism is large, thereby a distance between the heater core and the evaporator is required to be elongated for securing the mounting space. As a result, there is a possibility that the air conditioning unit becomes upsized.

The present disclosure addresses the above issues, and it is an objective of the present disclosure to provide an air conditioner for a vehicle that has two doors for mixing air with which an air conditioning unit can be downsized.

An air conditioner for a vehicle of the present disclosure has an air conditioning case, a cooling heat exchanger, a heating heat exchanger, a first cool-air bypass path, a second cool-air bypass path, a first air-mix door, a second air-mix door, a first shaft, a second shaft, and a rack. The air conditioning case forms an air passage in which air flows toward an inside of a vehicle compartment. The cooling heat exchanger is arranged in the air passage and cools the air flowing in the air passage. The heating heat exchanger is arranged in the air passage on a downstream side of the cooling heat exchanger in an airflow direction and heats the air flowing in the air passage. The first cool-air bypass path is formed in a part adjacent to one end side of the heating heat exchanger, and air flows in the first cool-air bypass path while bypassing the heating heat exchanger. The second cool-air bypass path is formed in a part adjacent to an other end side of the heating heat exchanger, and air flows in the second cool-air bypass path while bypassing the heating heat exchanger. The first air-mix door is arranged in the air passage and adjusts an air volume ratio between a volume of air passing through the heating heat exchanger and a volume of air flowing in the first cool-air bypass path. The second air-mix door is arranged in the air passage and adjusts an air volume ratio between a volume of air passing through the heating heat exchanger and a volume of air flowing in the second cool-air bypass path. The first shaft (i) is connected to the first air-mix door inside of the air conditioning case, (ii) has a first exterior gear outside of the air conditioning case, and (iii) drives the first air-mix door in conjunction with being rotated. The second shaft (i) is arranged parallel to the first shaft, (ii) is connected to the second air-mix door inside of the air conditioning case, (iii) has a second exterior gear outside of the air conditioning case, and (iv) drives the second air-mix door in conjunction with being rotated. The rack is arranged outside of the air conditioning case, is engaged with the first exterior gear and the second exterior gear, and interlocks the first shaft and the second shaft with each other.

Since the rack has an elongated shape, a mounting space can be smaller with respect to a link mechanism, thereby an air conditioning unit can be downsized.

BRIEF DESCRIPTION OF DRAWINGS

FIG. 17 is a schematic external view illustrating the air conditioning unit in a maximum heating state according to the fifth embodiment.

FIG. 18 is a schematic sectional diagram illustrating an air conditioning unit in a maximum cooling state according to a fourth comparison example.

DESCRIPTION OF EMBODIMENTS

Figure 1:
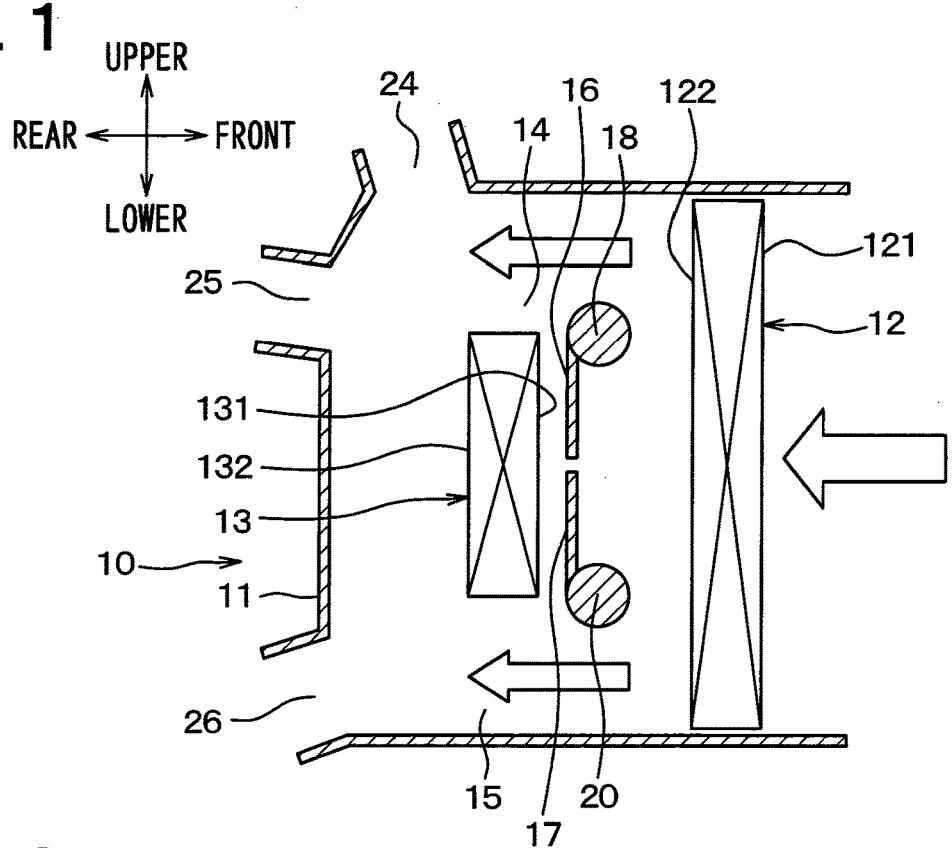
FIG. 1 is a schematic sectional diagram illustrating an air conditioning unit of an air conditioner for a vehicle in a maximum cooling state according to a first embodiment of the present disclosure.

Embodiments of the present disclosure will be described hereafter referring to drawings. In the embodiments, a part that corresponds to or equivalents to a matter described in a preceding embodiment may be assigned with the same reference number.

(First Embodiment)

A first embodiment of the present disclosure will be described.

In FIGS. 1 to 5, each arrow that points upper, lower, front, rear, left, or right points upper, lower, front, rear, left, or right on a condition of being mounted in a vehicle. An outlined arrow shows airflow.

A ventilation system of an air conditioner for a vehicle is roughly divided into two portions of a blower unit (not shown) and an air conditioning unit 10. The blower unit is arranged to be offset from a central part to a passenger seat side in a lower portion of an instrument board in a vehicle compartment. On the other hand, the air conditioning unit 10 is arranged in a generally central part of a left-right direction of the vehicle in the lower portion of the instrument board in a vehicle compartment.

The blower unit has an inside-air/outside-air switching case and a blower that draws air and blows the air through this inside-air/outside-air switching case although illustration is omitted. The inside-air/outside-air switching case is provided with an outside-air introducing port that introduces outside air (i.e., air outside of the vehicle compartment) and an inside-air introducing port that introduces inside air (i.e., air inside of the vehicle compartment). Each introducing port is open or closed by an inside-air/outside-air switching door.

The air conditioning unit 10 has an air conditioning case 11 that forms an air passage in which air flows toward an inside of the vehicle compartment. The air conditioning case 11 is configured by a molding that is made of resin such as polypropylene having a certain amount of elasticity and great intensity. Specifically, the air conditioning case 11 is configured by separated cases.

A foremost side surface of the air conditioning case 11 is provided with an air inlet (not shown).

An evaporator 12 is arranged at a position adjacent to the air inlet in the air passage formed in the air conditioning case 11. The evaporator 12 has generally a cuboid shape. An entirety of the evaporator 12 in an upper-lower direction of the vehicle is arranged in the air conditioning case 11 to be generally parallel with the upper-lower direction (i.e., a vertical direction). More specifically, an air inlet surface 121 and an air outlet surface 122 of the evaporator 12 are arranged generally parallel with the upper-lower direction (i.e., the vertical direction).

A length of the evaporator 12 in the left-right direction is set to be substantially the same as a length of the air conditioning case 11 in the left-right direction.

The evaporator 12 is a cooling heat exchanger that cools conditioned air by absorbing an evaporative latent heat of refrigerant in a refrigerant cycle from the conditioned air. The evaporator 12 has a flat tube through which the refrigerant passes and a heat exchanging core that is configured by a corrugated fin connected to the flat tube.

A heater core 13 is arranged in the air passage in the air conditioning case 11 on a downstream side of the evaporator 12 in an air flow direction (i.e., a rear side of the evaporator 12) to be a specified distance away from the evaporator 12.

The heater core 13 has generally a cuboid shape and is arranged generally parallel with the upper-lower direction (i.e., the vertical direction). More specifically, an air inlet surface 131 and an air outlet surface 132 of the heater core 13 are arranged parallel with the upper-lower direction (i.e., the vertical direction).

In other words, as shown in FIG. 1, the air outlet surface 122 of the evaporator 12 and the air inlet surface 131 of the heater core 13 are parallel with each other when viewed in an axial direction of a first shaft 18 and a second shaft 20 that are described after (i.e., parallel with each other in the left-right direction).

A length of the heater core 13 in the left-right direction is set substantially the same as a length of the air conditioning case 11 in the left-right direction.

The heater core 13 is a heating heat exchanger that re-heats a cool air after passing through the evaporator 12. The heater core 13 has a heat exchanging core that includes tubes (i.e., flat tubes) through which engine coolant (i.e., a heat exchange medium) having a high temperature passes and a corrugated fin that is connected to the tubes.

First and second air-mix doors 16, 17 that provide a temperature adjusting part is arranged between the evaporator 12 and the heater core 13 in the air passage in the air conditioning case 11.

The first air-mix door 16 adjusts an air volume ratio between a volume of warm air that is heated in an upper portion of the heat exchanging core of the heater core 13 and a volume of cool air flowing in the first cool-air bypass path 14 to bypass the heater core 13.

The second air-mix door 17 adjusts an air volume ratio between a volume of warm air that is heated in a lower portion of the heat exchanging core of the heater core 13 and a volume of cool air flowing in the second cool-air bypass path 15 to bypass the heater core 13.

The first and second air-mix doors 16, 17 are configured by a slide door that moves slidably parallel (including an error range of ±15°) with the air inlet surface 131 of the heater core 13. The first and second air-mix doors 16, 17 has a structure that a door body having a plate shape and a rack are integrated with each other although an illustration is omitted.

The first shaft 18 having a cylindrical shape is arranged between the evaporator 12 and the heater core 13 on an upstream side of the first air-mix door 16 in the airflow direction (i.e., a front side of the first air-mix door 16). The first shaft 18 is arranged parallel (including an error range of ±5°) with the air inlet surface 131 of the heater core 13 and the air outlet surface 122 of the evaporator 12.

The first shaft 18 is arranged such that a middle portion of which in the axial direction is located inside of the air conditioning case 11 and that both end sides of which in the axial direction protrude outside of the air conditioning case 11. The first shaft 18 extends in the left-right direction and supported in a side surface of the air conditioning case 11 to be rotatable.

Figure 4:
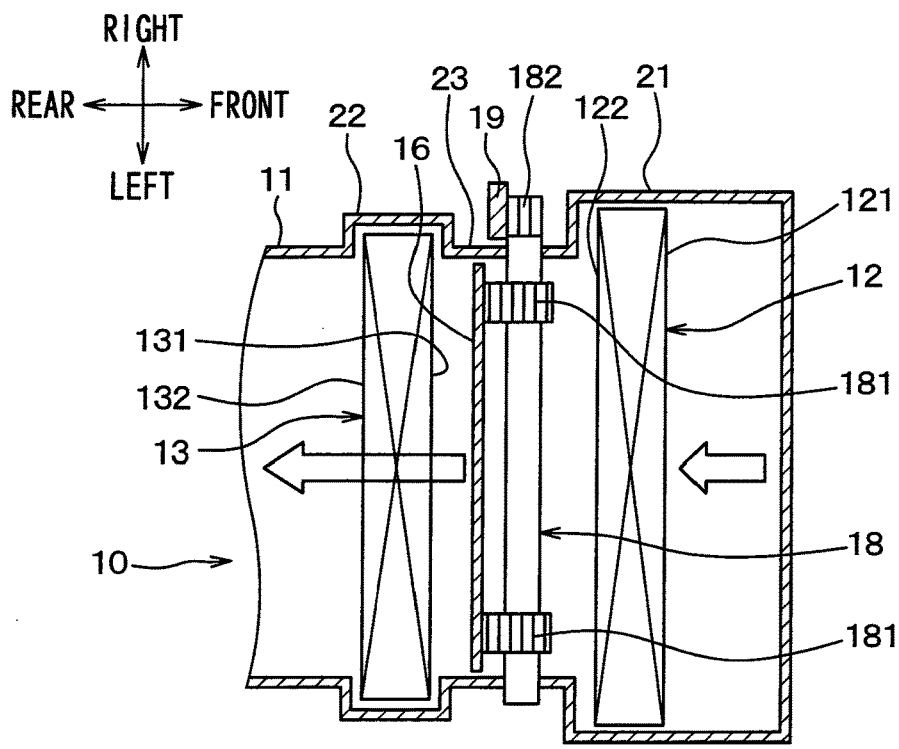
FIG. 4 is a sectional diagram taken along a line IV-IV shown in FIG. 3.

As shown in FIG. 4, in a portion of the first shaft 18 that is located inside of the air conditioning case 11, a first interior gear 181 that is engaged with the rack of the first air-mix door 16 is arranged.

In a portion of the first shaft 18 that is located outside of the air conditioning case 11, a first exterior gear 182 that is engaged with a rack 19 having an elongated shape and located outside of the air conditioning case 11 is arranged. In other words, the first shaft 18 has the first exterior gear 182 outside of the air conditioning case 11. An electric motor (not shown) that is arranged outside of the air conditioning case 11 is directly connected to the first shaft 18.

The second shaft 20 having a cylindrical shape is arranged between the evaporator 12 and the heater core 13 on an upstream side of the second air-mix door 17 in the airflow direction (i.e., a front side of the second air-mix door 17) to be parallel with the first shaft 18. The second shaft 20 is arranged such that a middle portion of which in the axial direction is located inside of the air conditioning case 11 and that both end sides of which in the axial direction protrude outside of the air conditioning case 11. The second shaft 20 extends in the left-right direction and supported in a side surface of the air conditioning case 11 to be rotatable.

Figure 5:
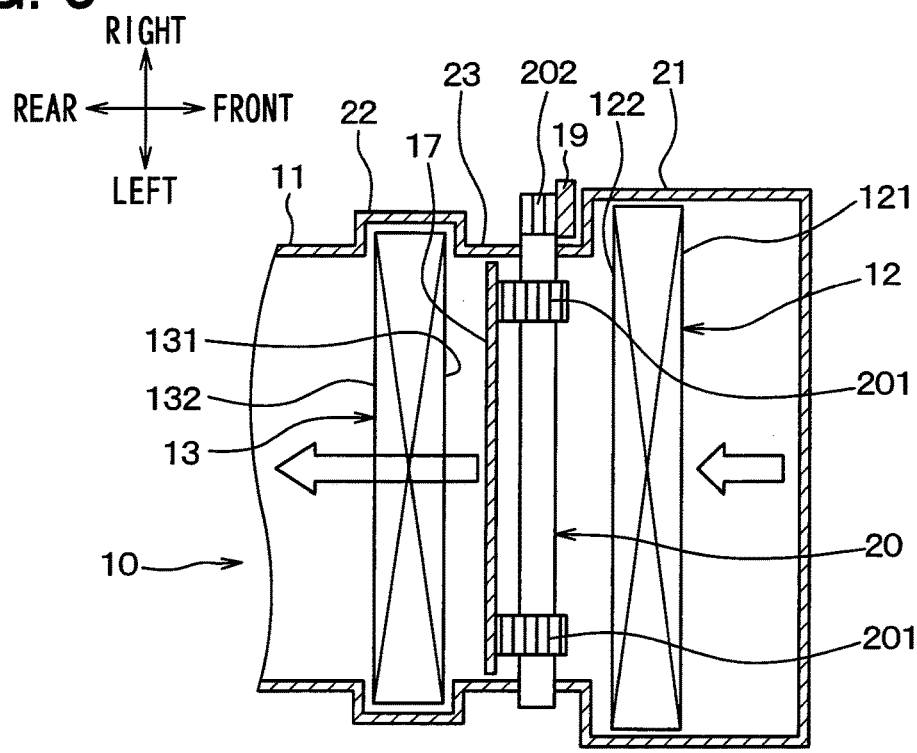
FIG. 5 is a sectional diagram taken along a line V-V shown in FIG. 3.

As shown in FIG. 5, in a portion of the second shaft 20 that is located inside of the air conditioning case 11, a second interior gear 201 that is engaged with the rack of the second air-mix door 17 is arranged.

In a portion of the second shaft 20 that is located outside of the air conditioning case 11, a second exterior gear 202 that is engaged with the rack 19 is arranged. In other words, the second shaft 20 has the second exterior gear 202 outside of the air conditioning case 11.

By driving the first shaft 18 rotatably using the electric motor, a rotational movement of the first shaft 18 is converted to a sliding movement of the first air-mix door 16, thereby a position of the first air-mix door 16 is adjusted.

The rotational movement of the first shaft 18 is transmitted to the second shaft 20 through the rack 19, thereby the second shaft 20 is driven rotatably. A rotational movement of the second shaft 20 is converted to a sliding movement of the second air-mix door 17, thereby a position of the second air-mix door 17 is adjusted.

The first exterior gear 182 is engaged with the rack 19 on a side adjacent to the heater core 13, and the second exterior gear 202 is engaged with the rack 19 on a side adjacent to the evaporator 12. Therefore, the first shaft 18 rotates in a direction that is opposite to a direction in which the second shaft 20 rotates, and the first air-mix door 16 slides in a direction that is opposite to a direction in which the second air-mix door 17 slides.

The air conditioning case 11 has an evaporator-housing protruding portion 21, a heater-core-housing protruding portion 22, and a recessed portion 23. An upper end portion of the evaporator 12 is housed and supported in the evaporator-housing protruding portion 21. An upper end portion of the heater core 13 is housed and supported in the heater-core-housing protruding portion 22. The recessed portion 23 is located between the evaporator-housing protruding portion 21 and the heater-core-housing protruding portion 22. The recessed portion 23 is recessed toward an inner side of the air-conditioning case to be located on an inner side of the evaporator-housing protruding portion 21 and the heater-core-housing protruding portion 22. At least a part of the rack 19 is located in the recessed portion 23.

A defroster opening 24 is open in an upper wall portion of the air conditioning case 11. The defroster opening 24 is connected to a defroster outlet through a defroster duct that is not shown, and air is blown from the defroster outlet toward an inner surface of a windshield.

A front-seat face opening 25 is open in the upper wall portion of the air conditioning case 11 on a rear side of the defroster opening 24 (i.e., on a side adjacent to a passenger). The front-seat face opening 25 is connected to a face outlet that is arranged on an upper side of the instrument panel through a face duct that is not shown, and air is blown from the face outlet toward a head of the passenger seating a front seat in the vehicle compartment.

A foot opening 26 is open in a lower portion of a rear wall surface of the air conditioning case 11, and air is blown from the foot opening 26 toward foot of the passenger seating the front seat.

With the above-described configuration, in a maximum cooling, the first shaft 18 rotates counterclockwise by the electric motor such that the first air-mix door 16 moves from an upper side to a lower side referring to FIG. 1. In conjunction with the rotation of the first shaft 18, the rack 19 moves from the upper side to the lower side, and the second shaft 20 rotates clockwise such that the second air-mix door 17 moves from the lower side to the upper side referring to FIG. 1. As a result, as shown in FIG. 1, a side adjacent to the first and second cool-air bypass paths 14, 15 are fully open, and a side adjacent to the heater core 13 is fully closed.

Figure 2:
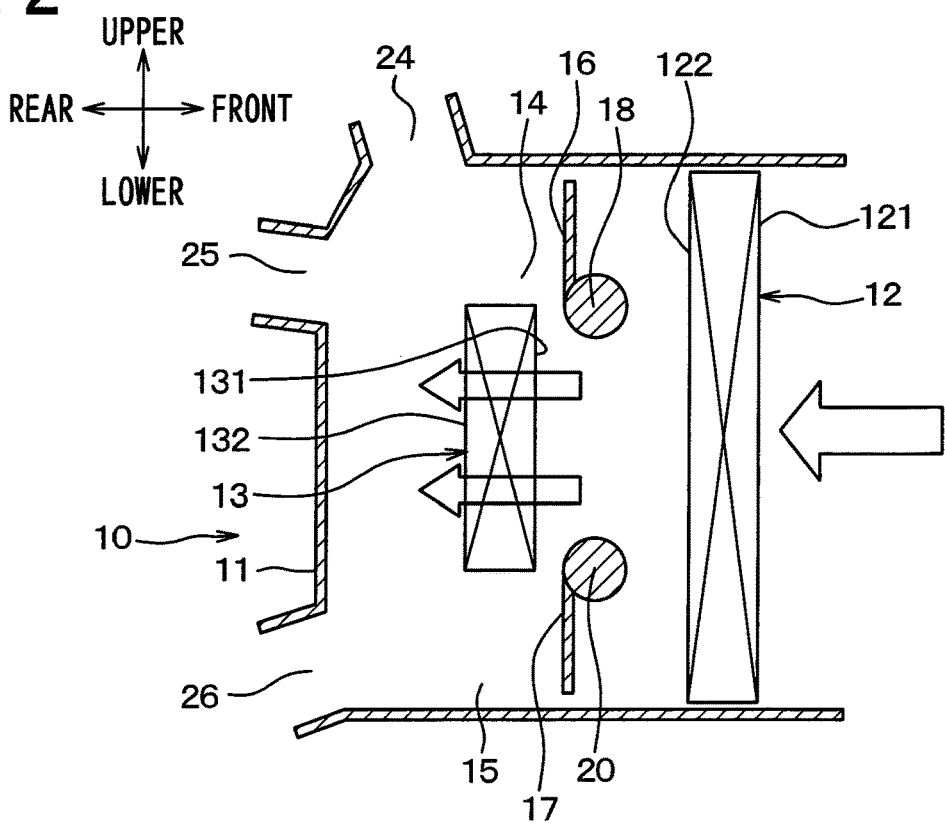
FIG. 2 is a schematic sectional diagram illustrating the air conditioning unit in a maximum heating state according to the first embodiment.
Figure 3:
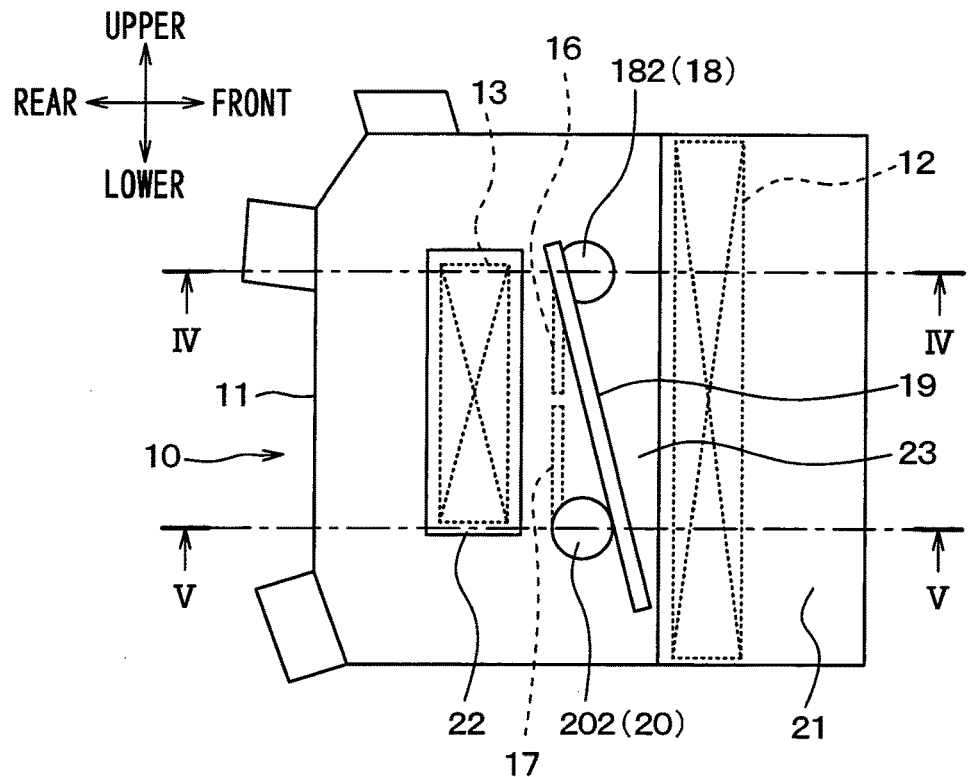
FIG. 3 is a schematic external diagram according to the first embodiment.

On the other hand, in a maximum heating, the first shaft 18 rotates clockwise by the electric motor such that the first air-mix door 16 moves from the lower side to the upper side referring to FIG. 1. In conjunction with the rotation of the first shaft 18, the rack 19 moves from the lower side to the upper side, and the second shaft 20 rotates counterclockwise such that the second air-mix door 17 moves from the upper side to the lower side referring to FIG. 1. As a result, as shown in FIG. 2, the side adjacent to the first and second cool-air bypass paths 14, 15 are fully closed, and the side adjacent to the heater core 13 is fully open.

According to the present embodiment, since the rack 19 has the elongated shape, a mounting space can be smaller as compared to a link mechanism, thereby the air conditioning unit 10 can be downsized.

Moreover, at least part of the rack 19 is located inside of the recessed portion 23, thereby the length of the air conditioning unit 10 in the left-right direction can be shortened.

Figure 6:
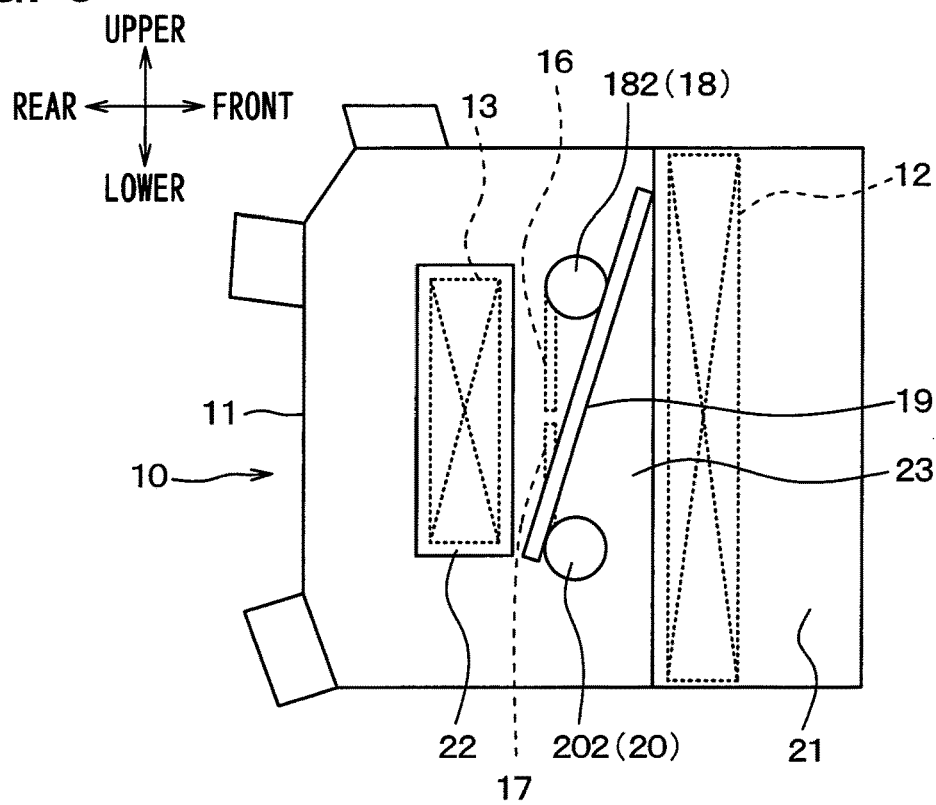
FIG. 6 is a schematic external view illustrating a modification example of the first embodiment.

According to the above-described embodiment, the first exterior gear 182 is engaged with the rack 19 on the side adjacent to the heater core 13, and the second exterior gear 202 is engaged with the rack 19 on the side adjacent to the evaporator 12. However, as a modification example shown in FIG. 6, the first exterior gear 182 may be engaged with the rack 19 on the side adjacent to the evaporator 12, and the second exterior gear 202 is engaged with the rack 19 on the side adjacent to the heater core 13. In this case, the first shaft 18 rotates in a direction that is opposite to a direction in which the second shaft 20 rotates, and the first air-mix door 16 slides in a direction that is opposite to a direction in which the second air-mix door 17 slides.

(Second Embodiment)

A second embodiment of the present disclosure will be described. The second embodiment will be described with a part that is different from the first embodiment.

Figure 7:
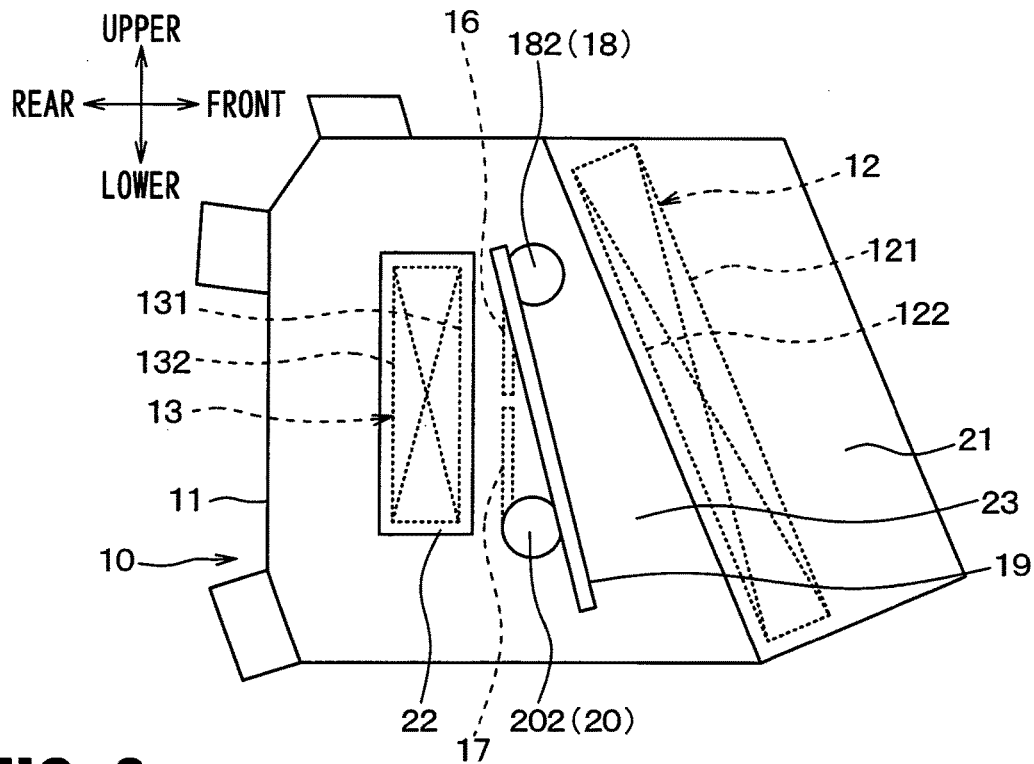
FIG. 7 is a schematic external view illustrating an air conditioning unit of an air conditioner for a vehicle in a maximum cooling state according to a second embodiment of the present disclosure.
Figure 8:
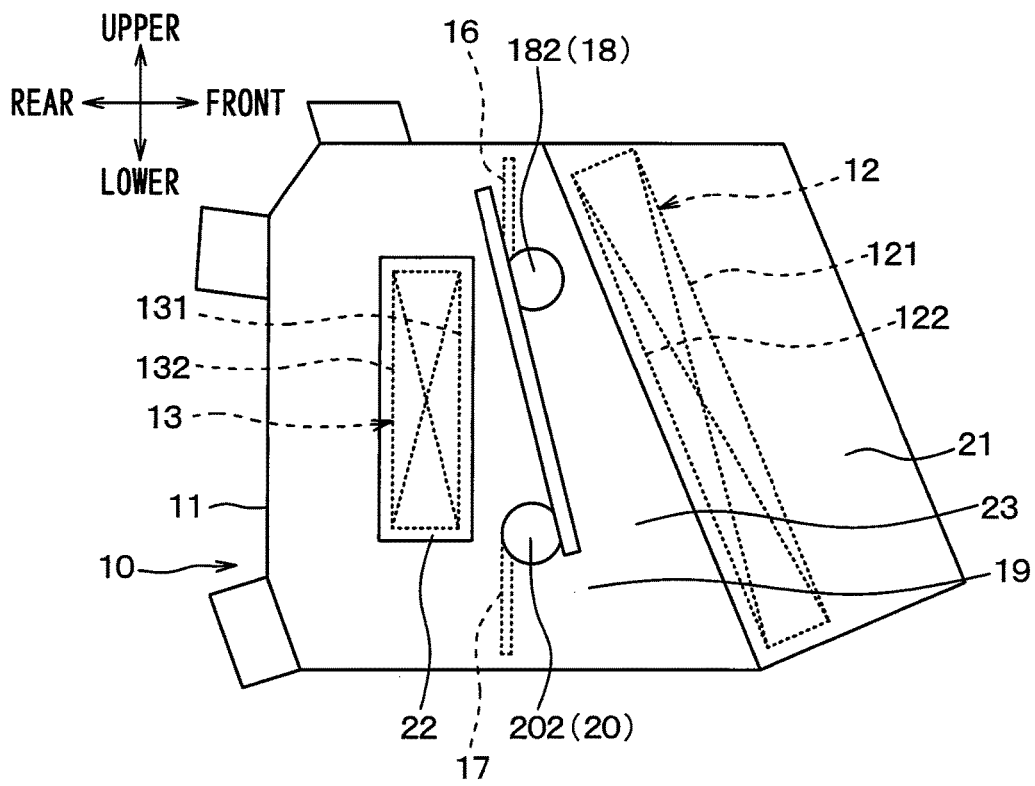
FIG. 8 is a schematic sectional view illustrating the air conditioning unit in a maximum heating state according to the second embodiment.

As shown in FIGS. 7 and 8, the evaporator 12 is arranged such that the air inlet surface 121 and the air outlet surface 122 of which are non-parallel with the upper-lower direction (i.e., the vertical direction) when viewed in the axial direction of the first shaft 18 and the second shaft 20. In other words, according to the present embodiment, the evaporator 12 inclines with respect to the upper-lower direction. More specifically, an upper end side of the evaporator 12 is located on a rear side of a lower end side of the evaporator 12.

On the other hand, the heater core 13 is arranged such that the air inlet surface 131 and the air outlet surface 132 of which are generally parallel with the upper-lower direction (i.e., the vertical direction).

In other words, the air outlet surface 122 of the evaporator 12 and the air inlet surface 131 of the heater core 13 are non-parallel with each other when viewed in the axial direction of the first shaft 18 and the second shaft 20. More specifically, a void in the airflow direction on an upper side between the air outlet surface 122 and the air inlet surface 131 is narrower than a void in the airflow direction on a lower side between the air outlet surface 122 and the air inlet surface 131.

The first exterior gear 182 that is located in a narrower area of the void between the air outlet surface 122 and the air inlet surface 131 in the airflow direction is engaged with the rack 19 on the side adjacent to the heater core 13. The second exterior gear 202 that is located in a broader area of the void between the air outlet surface 122 and the air inlet surface 131 in the airflow direction is engaged with the rack 19 on the side adjacent to the evaporator 12.

Figure 9:
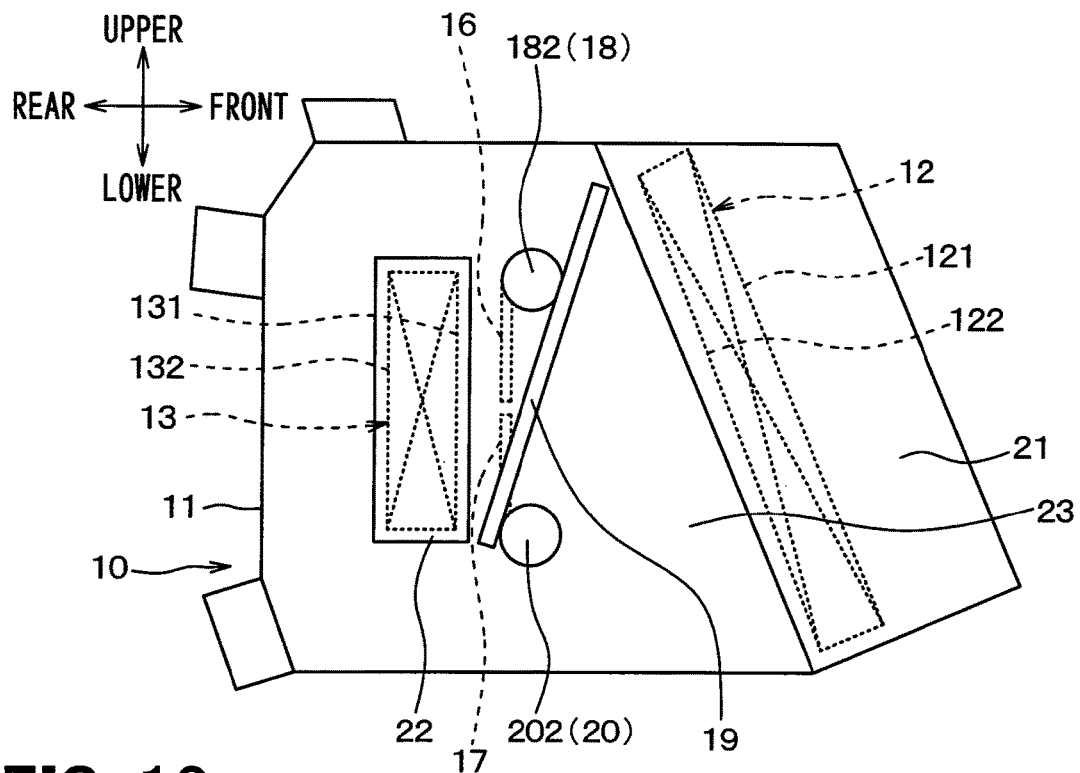
FIG. 9 is a schematic external view illustrating an air conditioning unit in a maximum cooling state according to a first comparison example.

According to a first comparison example shown in FIG. 9, the first exterior gear 182 that is located in the narrower area of the void between the air outlet surface 122 and the air inlet surface 131 in the airflow direction is engaged with the rack 19 on the side adjacent to the evaporator 12. Further, the second exterior gear 202 that is located in the broader area of the void between the air outlet surface 122 and the air inlet surface 131 in the airflow direction is engaged with the rack 19 on the side adjacent to the heater core 13.

In a case of the first comparison example, the rack 19 moves from the lower side to the upper side when the maximum cooling is set, and an upper end of the rack 19 moves rapidly toward the evaporator-housing protruding portion 21. Then, to avoid collision of the upper end of the rack 19 with the evaporator-housing protruding portion 21 in the maximum cooling, a dimension between the evaporator 12 and the heater core 13 in the airflow direction is required to be larger.

In contrast, according to the present embodiment, the rack 19 moves from the upper side to the lower side when the maximum cooling is set, and a lower end of the rack 19 moves gradually away from the evaporator-housing protruding portion 21. Alternatively, the lower end of the rack 19 moves toward the evaporator-housing protruding portion 21 slowly as compared to the first comparison example. Therefore, according to the present embodiment, the dimension between the evaporator 12 and the heater core 13 can be shortened as compared to the first comparison example. As a result, a length of the air conditioning unit 10 in the front-rear direction can be shortened.

According to the present embodiment, a similar effect as the first embodiment can be acquired.

(Third Embodiment)

A third embodiment of the present disclosure will be described. The third embodiment will be described with a part that is different from the first embodiment.

Figure 10:
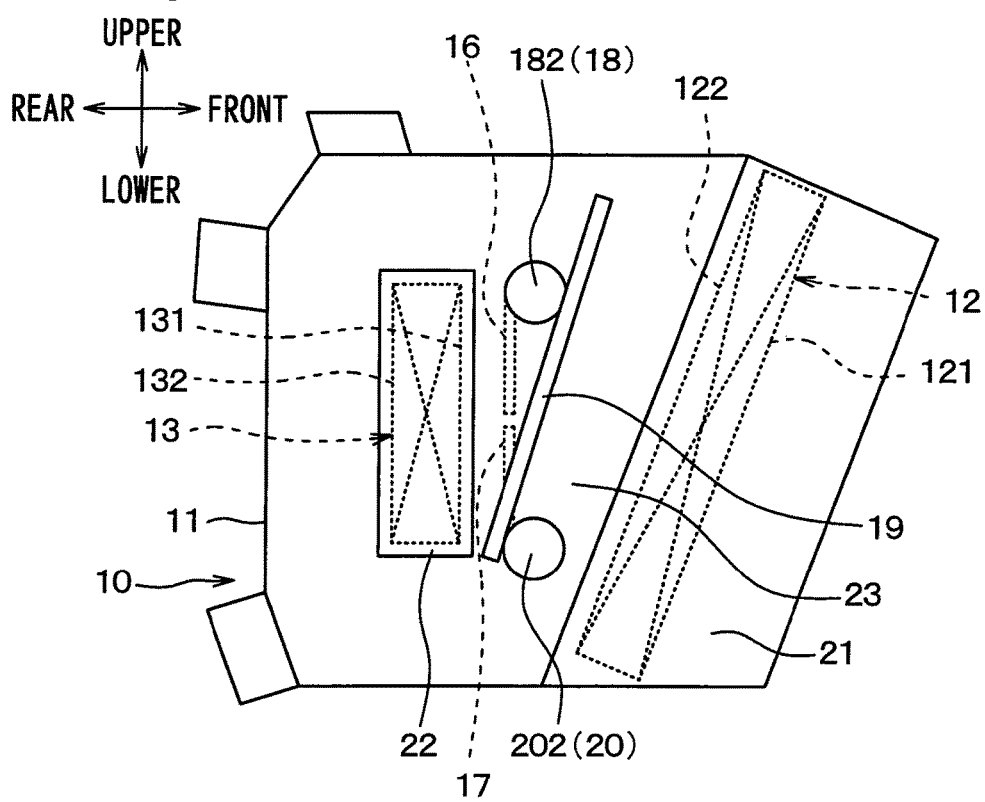
FIG. 10 is a schematic external view illustrating an air conditioning unit of an air conditioner for a vehicle in a maximum cooling state according to a third embodiment of the present disclosure.
Figure 11:
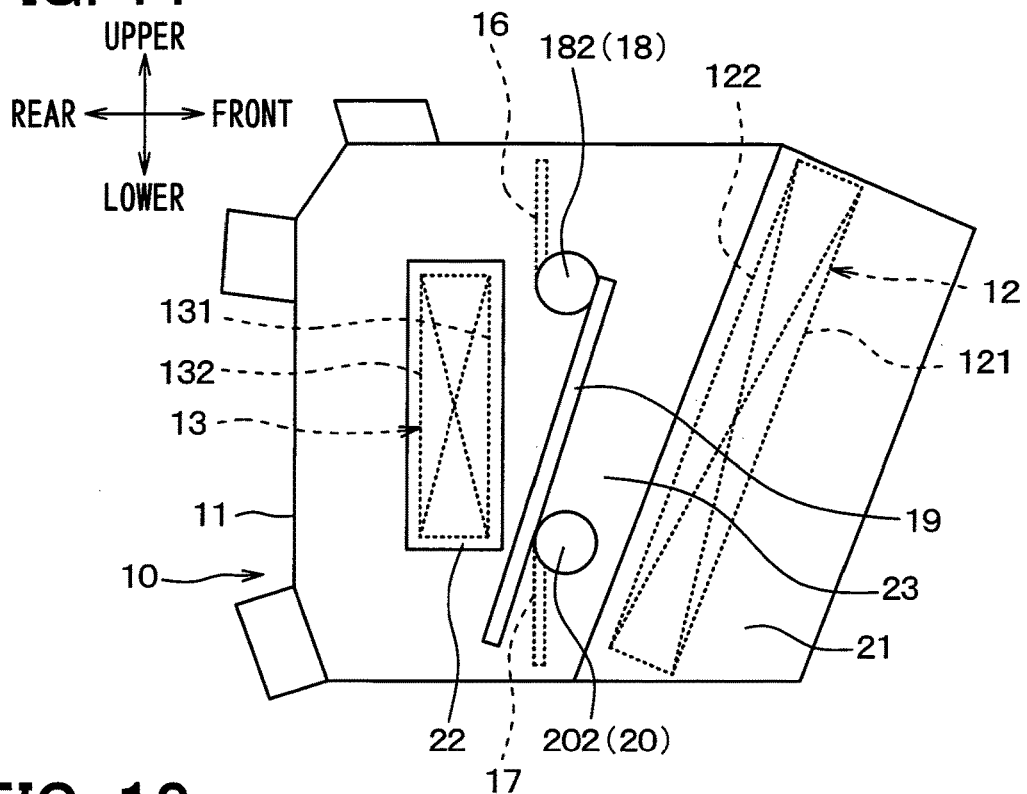
FIG. 11 is a schematic external view illustrating the air conditioning unit in a maximum heating state according to the third embodiment.

As shown in FIGS. 10 and 11, the evaporator 12 is arranged such that the air inlet surface 121 and the air outlet surface 122 of which are non-parallel with the upper-lower direction (i.e., the vertical direction) when viewed in the axial direction of the first shaft 18 and the second shaft 20. In other words, the evaporator 12 inclines with respect to the upper-lower direction. More specifically, the upper end side of the evaporator 12 is located on a front side of the lower end side of the evaporator 12.

On the other hand, the heater core 13 is arranged such that the air inlet surface 131 and the air outlet surface 132 of which are generally parallel with the upper-lower direction (i.e., the vertical direction).

In other words, the air outlet surface 122 of the evaporator 12 and the air inlet surface 131 of the heater core 13 are non-parallel with each other when viewed in the axial direction of the first shaft 18 and the second shaft 20. More specifically, the void in the airflow direction on the upper side between the air outlet surface 122 and the air inlet surface 131 is broader than the void in the airflow direction on the lower side between the air outlet surface 122 and the air inlet surface 131.

The second exterior gear 202 that is located in the narrower area of the void between the air outlet surface 122 and the air inlet surface 131 in the airflow direction is engaged with the rack 19 on the side adjacent to the heater core 13. The first exterior gear 182 that is located in the broader area of the void between the air outlet surface 122 and the air inlet surface 131 in the airflow direction is engaged with the rack 19 on the side adjacent to the evaporator 12.

Figure 12:
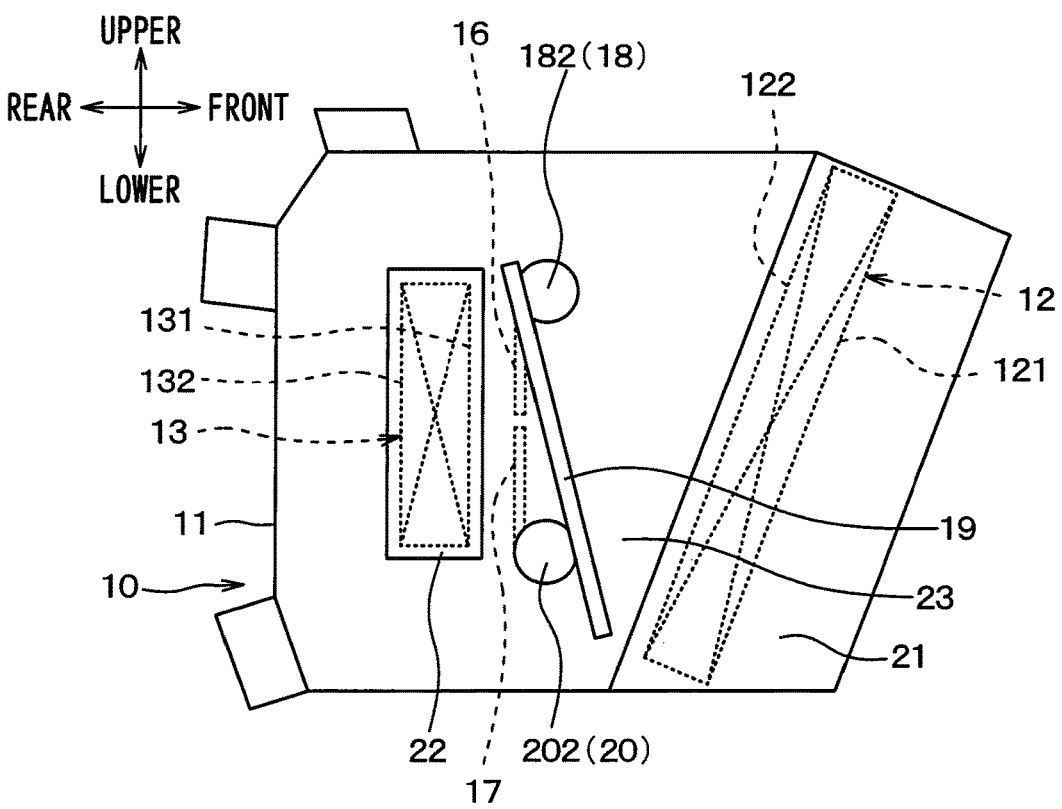
FIG. 12 is a schematic external view illustrating an air conditioning unit in a maximum cooling state according to a second comparison example.

According to a second comparison example shown in FIG. 12, the second exterior gear 202 that is located in the narrower area of the void between the air outlet surface 122 and the air inlet surface 131 in the airflow direction is engaged with the rack 19 on the side adjacent to the evaporator 12. The first exterior gear 182 that is located in the broader area of the void between the air outlet surface 122 and the air inlet surface 131 in the airflow direction is engaged with the rack 19 on the side adjacent to the heater core 13.

In a case of the second comparison example, the rack 19 moves from the upper side to the lower side when the maximum cooling is set, and the lower end of the rack 19 moves rapidly toward the evaporator-housing protruding portion 21. Then, to avoid collision of the lower end of the rack 19 with the evaporator-housing protruding portion 21 in the maximum cooling, a dimension between the evaporator 12 and the heater core 13 in the airflow direction is required to be larger.

In contrast, according to the present embodiment, the rack 19 moves from the lower side to the upper side when the maximum cooling is set, and the upper end of the rack 19 moves gradually away from the evaporator-housing protruding portion 21. Alternatively, the upper end of the rack 19 moves toward the evaporator-housing protruding portion 21 slowly as compared to the second comparison example. Therefore, according to the present embodiment, the dimension between the evaporator 12 and the heater core 13 can be shortened as compared to the second comparison example. As a result, a length of the air conditioning unit 10 in the front-rear direction can be shortened.

According to the present embodiment, a similar effect as the first embodiment can be acquired.

(Fourth Embodiment)

A fourth embodiment of the present disclosure will be described. The fourth embodiment will be described with a part that is different from the first embodiment.

Figure 13:
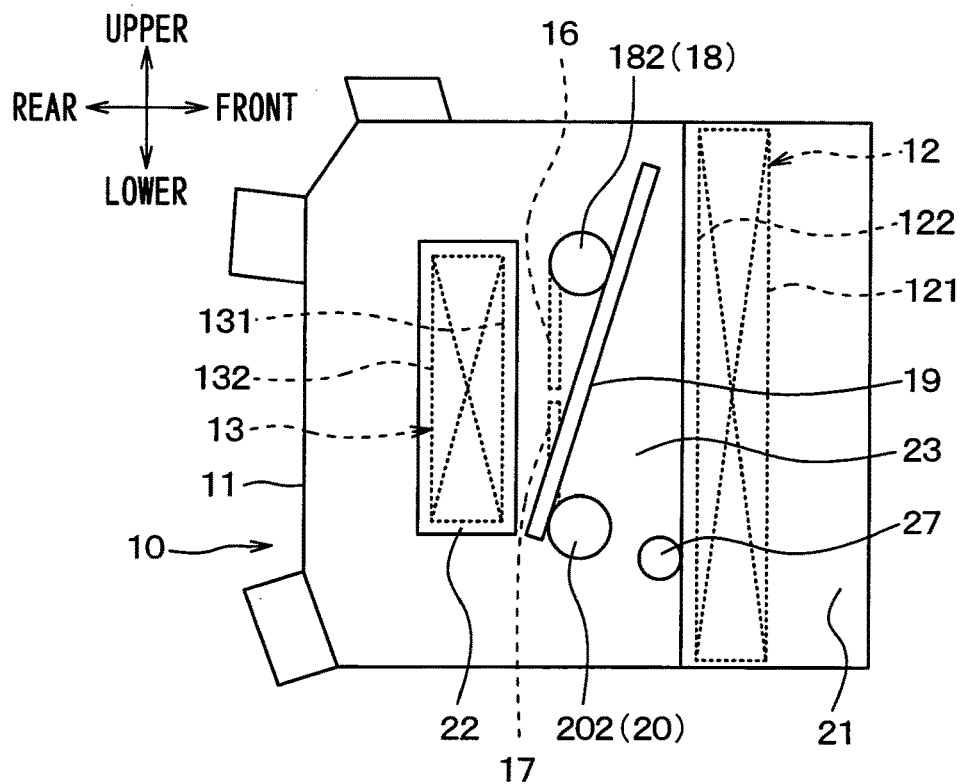
FIG. 13 is a schematic external view illustrating an air conditioning unit of an air conditioner for a vehicle in a maximum cooling state according to a fourth embodiment of the present disclosure.
Figure 14:
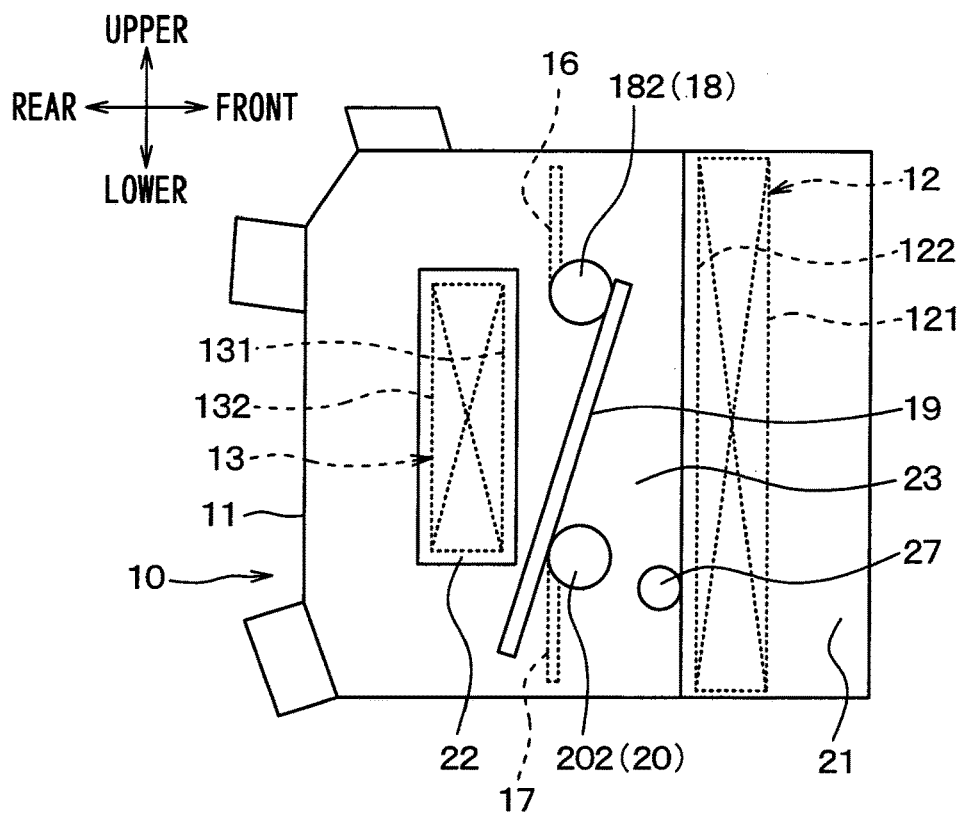
FIG. 14 is a schematic external view illustrating the air conditioning unit in a maximum heating state according to the fourth embodiment.

As shown in FIGS. 13 and 14, the air conditioning unit 10 has a temperature sensor 27 that detects a temperature of air after passing through the evaporator 12.

The temperature sensor 27 has a temperature detection part that is located inside of the air conditioning case 11 and a connector housing that protrudes outside of the air conditioning case 11.

The temperature detection part is located adjacent to the air outlet surface 122 of the evaporator 12 on a downstream side of the air outlet surface 122 of the evaporator 12 in the airflow direction.

Further, the temperature sensor 27 is arranged on a lower side in the air conditioning case 11. More specifically, the temperature sensor 27 is located at a position closer to the second exterior gear 202 than to the first exterior gear 182.

The second exterior gear 202 that is located close to the temperature sensor 27 is engaged with the rack 19 on the side adjacent to the heater core 13. The first exterior gear 182 that is located further from the temperature sensor 27 than the second exterior gear 202 is engaged with the rack 19 on the side adjacent to the evaporator 12.

Figure 15:
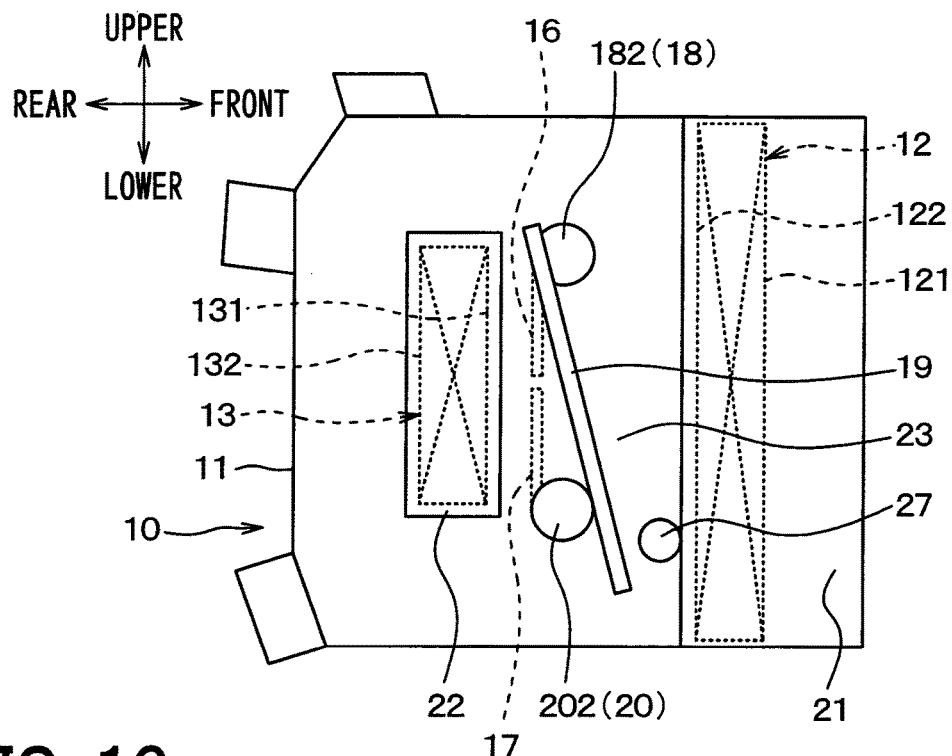
FIG. 15 is a schematic external view illustrating an air conditioning unit in a maximum cooling state according to a third comparison example.

According to a third comparison example shown in FIG. 15, the second exterior gear 202 that is located close to the temperature sensor 27 is engaged with the rack 19 on the side adjacent to the evaporator 12. The first exterior gear 182 that is located further from the temperature sensor 27 than the second exterior gear 202 is engaged with the rack 19 on the side adjacent to the heater core 13.

In a case of the third comparison example, the rack 19 and the connector housing of the temperature sensor 27 are arranged to overlap with each other along the airflow direction between the evaporator-housing protruding portion 21 and the second exterior gear 202. In contrast, according to the present embodiment, only the rack 19 is located between the evaporator-housing protruding portion 21 and the second exterior gear 202. Therefore, according to the present embodiment, the dimension between the evaporator 12 and the heater core 13 can be shortened as compared to the third comparison example. As a result, a length of the air conditioning unit 10 in the front-rear direction can be shortened.

According to the present embodiment, a similar effect as the first embodiment can be acquired.

(Fifth Embodiment)

A fifth embodiment of the present disclosure will be described. The fifth embodiment will be described with a part that is different from the first embodiment.

Figure 16:
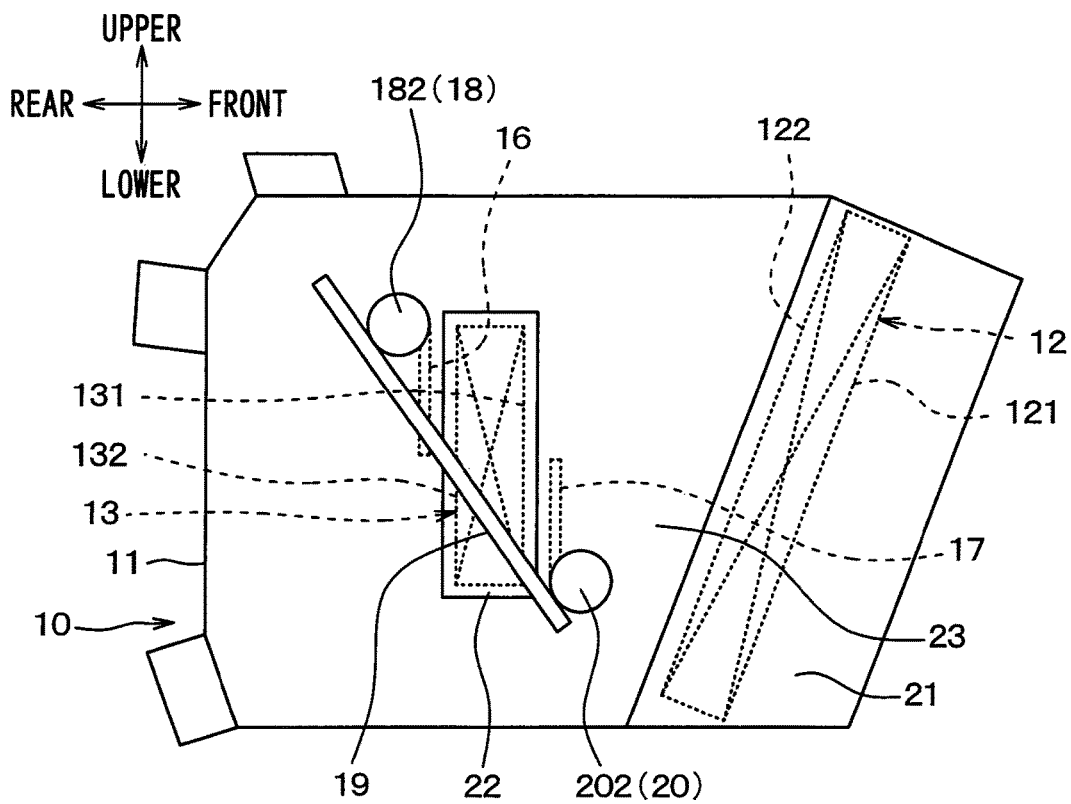
FIG. 16 is a schematic external view illustrating an air conditioning unit of an air conditioner for a vehicle in a maximum cooling state according to a fifth embodiment of the present disclosure.

As shown in FIGS. 16 and 17, the evaporator 12 is arranged such that the air inlet surface 121 and the air outlet surface 122 are non-parallel with the upper-lower direction (i.e., the vertical direction) (that is, incline with respect to the upper-lower direction) when viewed in the axial direction of the first shaft 18 and the second shaft 20. More specifically, the upper end side of the evaporator 12 is located on the front side of the lower end side of the evaporator 12.

On the other hand, the heater core 13 is arranged such that the air inlet surface 131 and the air outlet surface 132 of which are generally parallel with the upper-lower direction (i.e., the vertical direction).

In other words, the air outlet surface 122 of the evaporator 12 and the air inlet surface 131 of the heater core 13 are non-parallel with each other when viewed in the axial direction of the first shaft 18 and the second shaft 20. More specifically, the void between the air outlet surface 122 and the air inlet surface 131 in the airflow direction on the side adjacent to the first cool-air bypass path 14 (refer FIG. 1) is larger than the void between the air outlet surface 122 and the air inlet surface 131 in the airflow direction on the side adjacent to the second cool-air bypass path 15 (refer FIG. 1).

The first air-mix door 16 and the first shaft 18 that are located in a broader area of the void between the air outlet surface 122 and the air inlet surface 131 in the airflow direction are arranged on a downstream side of the heater core 13 in the airflow direction.

On the other hand, the second air-mix door 17 and the second shaft 20 that are located in a narrower area of the void between the air outlet surface 122 and the air inlet surface 131 in the airflow direction are arranged between the evaporator 12 and the heater core 13.

The rack 19 is engaged with a downstream portion of the first exterior gear 182 and is engaged with a downstream portion of the second exterior gear 202. In other words, the rack 19 is engaged with the first exterior gear 182 on a side further from the evaporator-housing protruding portion 21 and is engaged with the second exterior gear 202 on the side further from the evaporator-housing protruding portion 21.

According to a fourth comparison example shown in FIG. 18, the rack 19 is engaged with an upstream portion of the first exterior gear 182 and is engaged with an upstream portion of the second exterior gear 202. In other words, the rack 19 is engaged with the first exterior gear 182 on a side adjacent to the evaporator-housing protruding portion 21 and is engaged with the second exterior gear 202 on the side adjacent to the evaporator-housing protruding portion 21.

In a case of the fourth comparison example, the rack 19 is located between the second exterior gear 202 and the evaporator-housing protruding portion 21. Therefore, to avoid collision of the lower end of the rack 19 with the evaporator-housing protruding portion 21 in the maximum cooling, a dimension between the evaporator 12 and the heater core 13 in the airflow direction is required to be larger.

In contrast, according to the present embodiment, the rack 19 is arranged on a side that is opposite to the evaporator-housing protruding portion 21 with respect to the second exterior gear 202. Accordingly, the dimension between the evaporator 12 and the heater core 13 in the airflow direction can be shortened as compared to the fourth comparison example. As a result, a length of the air conditioning unit 10 in the front-rear direction can be shortened.

According to the present embodiment, a similar effect as the first embodiment can be acquired.

(Sixth Embodiment)

A sixth embodiment of the present disclosure will be described. The sixth embodiment will be described with a part that is different from the first embodiment.

Figure 19:
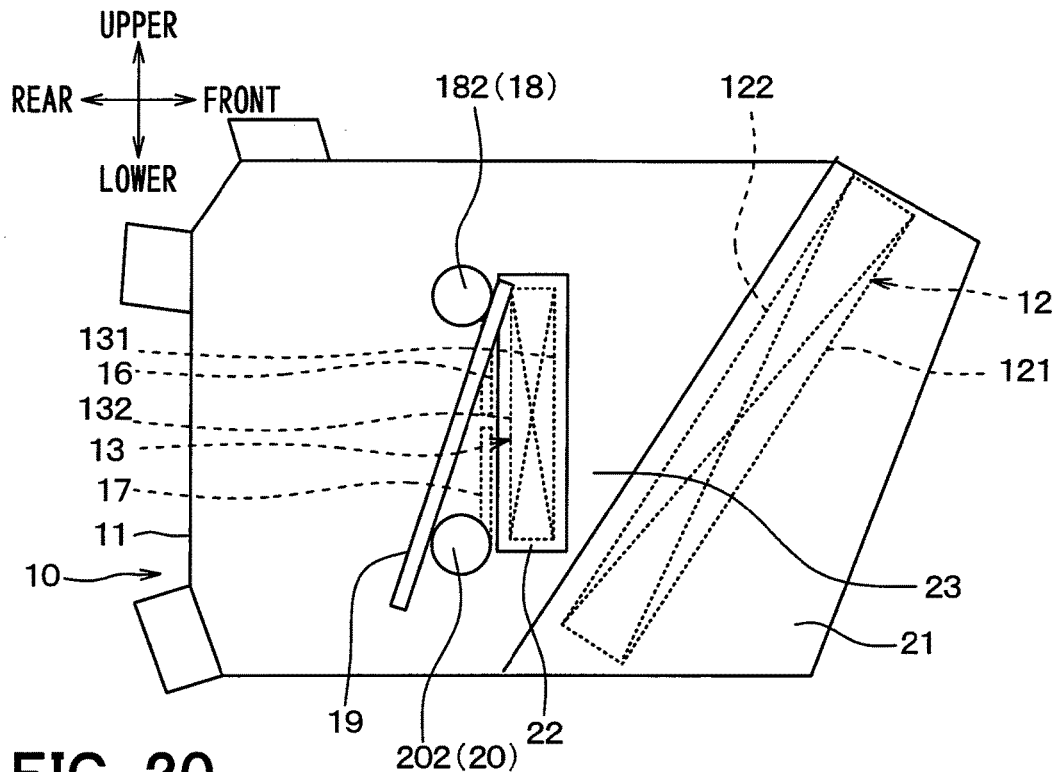
FIG. 19 is a schematic external view illustrating an air conditioning unit of an air conditioner for a vehicle in a maximum cooling state according to a sixth embodiment of the present disclosure.
Figure 20:
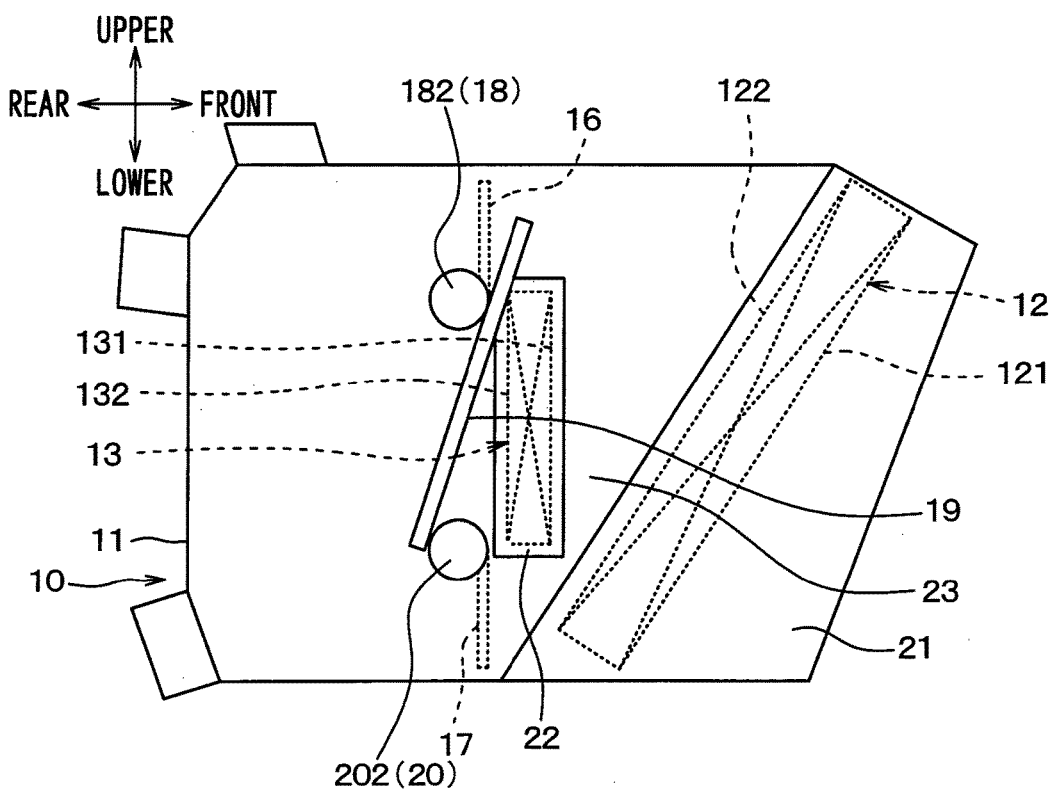
FIG. 20 is a schematic external view illustrating the air conditioning unit in a maximum heating state according to the sixth embodiment.

As shown in FIGS. 19 and 20, the evaporator 12 is arranged such that the air inlet surface 121 and the air outlet surface 122 are non-parallel with the upper-lower direction (i.e., the vertical direction) when viewed in the axial direction of the first shaft 18 and the second shaft 20. In other words, the evaporator 12 inclines with respect to the upper-lower direction. More specifically, the upper end side of the evaporator 12 is located on a front side of the lower end side of the evaporator 12.

On the other hand, the heater core 13 is arranged such that the air inlet surface 131 and the air outlet surface 132 of which are generally parallel with the upper-lower direction (i.e., the vertical direction).

In other words, the air outlet surface 122 of the evaporator 12 and the air inlet surface 131 of the heater core 13 are non-parallel with each other when viewed in the axial direction of the first shaft 18 and the second shaft 20. More specifically, the void between the air outlet surface 122 and the air inlet surface 131 in the airflow direction on the side adjacent to the first cool-air bypass path 14 (refer FIG. 1) is larger than the void between the air outlet surface 122 and the air inlet surface 131 in the airflow direction on the side adjacent to the second cool-air bypass path 15 (refer FIG. 1).

The first air-mix door 16 and the second air-mix door 17 are arranged on a downstream side of the heater core 13 in the airflow direction.

The first shaft 18 and the second shaft 20 are located on the downstream side of the heater core 13 in the airflow direction and arranged parallel (including an error range of ±5°) with the air inlet surface 131, the air outlet surface 132, and the air outlet surface 122.

The first exterior gear 182 that is located in the broader area of the void between the air outlet surface 122 and the air inlet surface 131 in the airflow direction is engaged with the rack 19 on the side adjacent to the heater core 13.

On the other hand, the second exterior gear 202 that is located in the narrower area of the void between the air outlet surface 122 and the air inlet surface 131 in the airflow direction is engaged with the rack 19 on a side opposite to the heater core 13.

Figure 21:
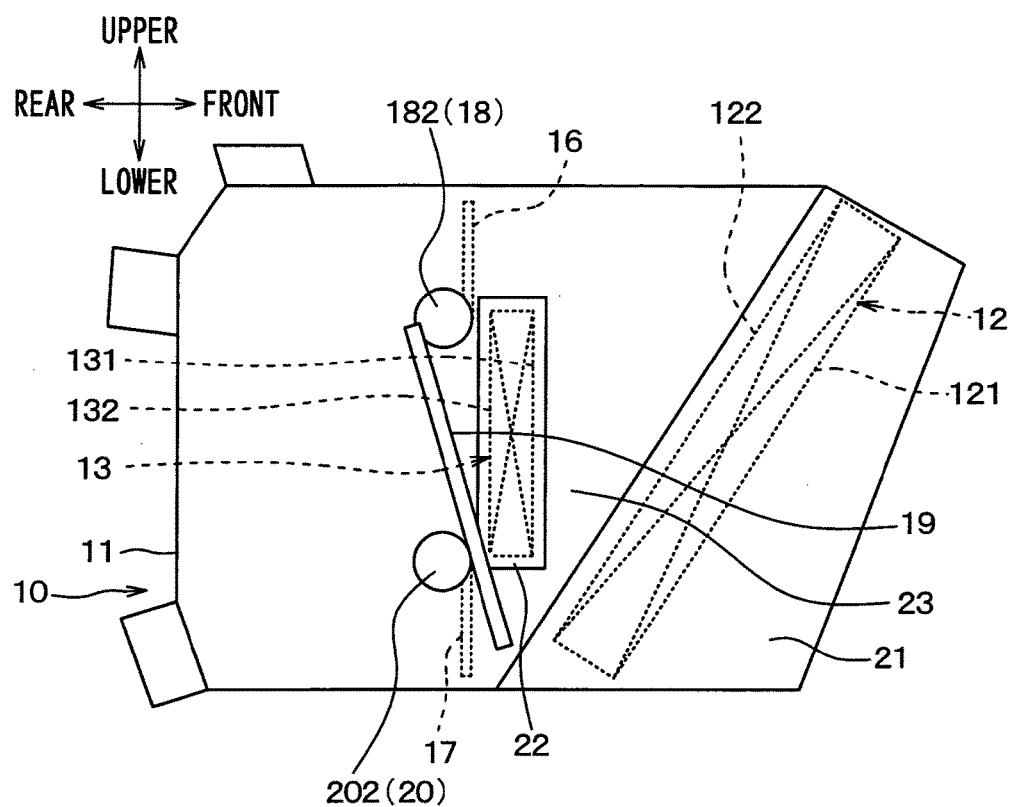
FIG. 21 is a schematic external view illustrating an air conditioning unit in a maximum heating state according to a fifth comparison example.

According to a fifth comparison example shown in FIG. 21, the second exterior gear 202 that is located in the narrower area of the void between the air outlet surface 122 and the air inlet surface 131 in the airflow direction is engaged with the rack 19 on the side adjacent to the heater core 13. The first exterior gear 182 that is located in the broader area of the void between the air outlet surface 122 and the air inlet surface 131 in the airflow direction is engaged with the rack 19 on the side opposite to the heater core 13.

In a case of the fifth comparison example, the rack 19 moves from the upper side to the lower side when the maximum heating is set, and the lower end of the rack 19 moves rapidly toward the evaporator-housing protruding portion 21. Then, to avoid collision of the lower end of the rack 19 with the evaporator-housing protruding portion 21 in the maximum heating, the dimension between the evaporator 12 and the heater core 13 in the airflow direction is required to be larger.

In contrast, according to the present embodiment, the rack 19 moves from the upper side to the lower side when the maximum cooling is set, and the lower end of the rack 19 moves gradually away from the evaporator-housing protruding portion 21. Alternatively, the lower end of the rack 19 moves toward the evaporator-housing protruding portion 21 slowly as compared to the fifth comparison example. Therefore, according to the present embodiment, the dimension between the evaporator 12 and the heater core 13 can be shortened as compared to the fifth comparison example. As a result, a length of the air conditioning unit 10 in the front-rear direction can be shortened.

According to the present embodiment, a similar effect as the first embodiment can be acquired.

(Other Modifications)

According to the above-described embodiments, the first and second air-mix doors 16, 17 configured by a slide door moves slidably parallel with the air inlet surface 131 of the heater core 13. However, the first and second air-mix doors 16, 17 configured by a slide door may move slidably on a condition of inclining with respect to the air inlet surface 131 of the heater core 13.

The first and second air-mix doors 16, 17 may be a cantilever door or a butterfly door, although the slide door was used as the first and second air-mix doors 16 and 17 in the above-described embodiments.

Furthermore, the present disclosure can be applied to an air conditioner for a vehicle with which the inside of the air conditioning case 11 is divided into two spaces such that an inside-air/outside-air two-layer flow mode can be set. In the inside-air/outside-air two-layer flow mode, outside air may flow in an upper space, and inside air may flow in a lower space.

The present disclosure is not limited to the above-described embodiments and can be modified within the scope of the present disclosure as defined by the appended claims.

In the above-described embodiments, it is to be understood that elements constituting the embodiments are not necessary except for a case of being explicitly specified to be necessary and a case of being considered to be absolutely necessary in principle.

Even when a factor such as a quantity of elements, a value, an amount, a range is mentioned in the above-described embodiments, it is to be understood that the factor is not limited to a specific value except for a case of being explicitly specified to be necessary and a case of being considered to be absolutely necessary in principle.

Even when a feature such as a material forming a member, a shape of a member, a positional relation of members, it is to be understood that such feature is not limited to a specific material, shape, positional relation, or the like except for a case of being explicitly specified to be necessary and a case of being considered to be absolutely necessary in principle.

The invention claimed is:

1. An air conditioner for a vehicle comprising:
   an air conditioning case that forms an air passage in which air flows toward an inside of a vehicle compartment;
   a cooling heat exchanger that is arranged in the air passage and cools the air flowing in the air passage;
   a heating heat exchanger that is arranged in the air passage on a downstream side of the cooling heat exchanger in an airflow direction and heats the air flowing in the air passage;

a first cool-air bypass path that is formed in a part adjacent to one end side of the heating heat exchanger, the first cool-air bypass path in which air flows while bypassing the heating heat exchanger;

a second cool-air bypass path that is formed in a part adjacent to an other end side of the heating heat exchanger, the second cool-air bypass path in which air flows while bypassing the heating heat exchanger;

a first air-mix door that is arranged in the air passage and adjusts an air volume ratio between a volume of air passing through the heating heat exchanger and a volume of air flowing in the first cool-air bypass path;

a second air-mix door that is arranged in the air passage and adjusts an air volume ratio between a volume of air passing through the heating heat exchanger and a volume of air flowing in the second cool-air bypass path;

a first shaft that (i) is connected to the first air-mix door inside of the air conditioning case, (ii) has a first exterior gear outside of the air conditioning case, and (iii) drives the first air-mix door in conjunction with being rotated;

a second shaft that (i) is arranged parallel to the first shaft, (ii) is connected to the second air-mix door inside of the air conditioning case, (iii) has a second exterior gear outside of the air conditioning case, and (iv) drives the second air-mix door in conjunction with being rotated; and a rack that is arranged outside of the air conditioning case, is engaged with the first exterior gear and the second exterior gear, and interlocks the first shaft and the second shaft with each other, wherein the air conditioning case has:
  a protruding portion in which an end portion of the cooling heat exchanger is housed and supported; and
  a recessed portion that is adjacent to the protruding portion and recessed toward an inner side of the air conditioning case to be located on an inner side of the protruding portion, and
at least a part of the rack is located in the recessed portion.

2. The air conditioner for a vehicle according to claim 1, wherein
the first air-mix door and the second air-mix door are configured by a slide door that has a plate shape and slides parallel with an air inlet surface of the heating heat exchanger.

3. The air conditioner for a vehicle according to claim 1, wherein
the first air-mix door and the second air-mix door are arranged between the cooling heat exchanger and the heating heat exchanger,
the first shaft and the second shaft are arranged between the cooling heat exchanger and the heating heat exchanger to be parallel with an air outlet surface of the cooling heat exchanger and an air inlet surface of the heating heat exchanger,
the air outlet surface of the cooling heat exchanger and the air inlet surface of the heating heat exchanger are arranged non-parallel with each other when viewed in an axial direction of the first shaft and the second shaft,
one exterior gear of the first exterior gear and the second exterior gear is (i) located in a narrower area of a void between the air outlet surface of the cooling heat exchanger and the air inlet surface of the heating heat exchanger and (ii) engaged with the rack on a side adjacent to the heating heat exchanger, and an other exterior gear of the first exterior gear and the second exterior gear is (i) located in a broader area of the void between the air outlet surface of the cooling heat exchanger and the air inlet surface of the heating heat exchanger and (ii) engaged with the rack on a side adjacent to the cooling heat exchanger.

4. The air conditioner for a vehicle according to claim 1, further comprising
a temperature sensor that is arranged adjacent to an air outlet surface of the cooling heat exchanger and detects a temperature of air after passing through the cooling heat exchanger, wherein
the first air-mix door and the second air-mix door are arranged between the cooling heat exchanger and the heating heat exchanger,
the first shaft and the second shaft are arranged between the cooling heat exchanger and the heating heat exchanger to be parallel with an air outlet surface of the cooling heat exchanger and an air inlet surface of the heating heat exchanger,
one exterior gear of the first exterior gear and the second exterior gear is located closer to the temperature sensor and engaged with the rack on a side adjacent to the heating heat exchanger, and
an other exterior gear of the first exterior gear and the second exterior gear is located away from the temperature sensor and engaged with the rack on a side adjacent to the cooling heat exchanger.

5. The air conditioner for a vehicle according to claim 1, wherein
an air outlet surface of the cooling heat exchanger and an air inlet surface of the heating heat exchanger are arranged non-parallel with each other when viewed in an axial direction of the first shaft and the second shaft,
a distance between the air outlet surface of the cooling heat exchanger and the air inlet surface of the heating heat exchanger on a side adjacent to the first cool-air bypass path is longer than a distance between the air outlet surface of the cooling heat exchanger and the air inlet surface of the heating heat exchanger on a side adjacent to the second cool-air bypass path,
the first air-mix door is arranged on a downstream side of the heating heat exchanger in the airflow direction,
the second air-mix door is arranged between the heating heat exchanger and the cooling heat exchanger,
the first shaft is arranged on the downstream side of the cooling heat exchanger in the airflow direction to be parallel with the air outlet surface of the cooling heat exchanger and the air inlet surface of the heating heat exchanger,
the second shaft is arranged between the heating heat exchanger and the cooling heat exchanger to be parallel with the air outlet surface of the cooling heat exchanger and the air inlet surface of the heating heat exchanger,
the rack is engaged with a downstream portion of the first exterior gear and engaged with a downstream portion of the second exterior gear.

6. The air conditioner for a vehicle according to claim 1, wherein
the first air-mix door and the second air-mix door are arranged on a downstream side of the heating heat exchanger,
the first shaft and the second shaft are arranged on the downstream side of the heating heat exchanger to be parallel with an air outlet surface of the cooling heat exchanger and an air inlet surface of the heating heat exchanger, the air outlet surface of the cooling heat exchanger and the air inlet surface of the heating heat exchanger are arranged non-parallel with each other when viewed in an axial direction of the first shaft and the second shaft, one exterior gear of the first exterior gear and the second exterior gear is (i) located in a narrower area of a void between the air outlet surface of the cooling heat exchanger and the air inlet surface of the heating heat exchanger and (ii) engaged with the rack on a side opposite to the heating heat exchanger, and an other exterior gear of the first exterior gear and the second exterior gear is (i) located in a broader area of the void between the air outlet surface of the cooling heat exchanger and the air inlet surface of the heating heat exchanger and (ii) engaged with the rack on a side adjacent to the heating heat exchanger.

* * * * *